United States Patent [19]
Reik et al.

[11] 3,798,418
[45] Mar. 19, 1974

[54] ELECTRIC HEATING MANTLES

[75] Inventors: Michael Kurt Reik, Edgware; Paul Leonard Johnson, Leagrave, both of England

[73] Assignee: Isapad Limited, Barnet Bypass, Borehamwood, England

[22] Filed: June 23, 1972

[21] Appl. No.: 265,500

[30] Foreign Application Priority Data
June 25, 1971 Great Britain..................... 29933/71

[52] U.S. Cl.................... 219/535, 23/292, 219/460, 219/521, 219/433, 219/436
[51] Int. Cl. ............................................ H05b 3/00
[58] Field of Search.... 219/280, 385, 386, 415–419, 219/459, 458, 460, 461, 429, 433, 436, 438–442, 520, 521, 535; 23/259 R, 292

[56] References Cited
UNITED STATES PATENTS

| | | | |
|---|---|---|---|
| 1,492,146 | 4/1924 | Thornton | 219/436 |
| 2,842,654 | 7/1958 | Anderson | 219/433 |
| 3,152,245 | 10/1964 | Litman | 219/433 |
| 2,840,683 | 6/1958 | Butcher | 219/521 |
| 2,097,681 | 11/1937 | Wolcott | 219/535 X |
| 1,567,870 | 12/1925 | Serrell | 219/458 X |
| 2,074,985 | 3/1937 | Hofferbert | 219/417 |
| 2,607,876 | 8/1952 | Bergen et al | 219/535 X |
| 1,378,474 | 5/1921 | Lidberg | 219/535 X |
| 2,793,278 | 5/1957 | Anderson et al. | 219/521 X |
| 3,484,585 | 12/1969 | Morey | 219/535 |

FOREIGN PATENTS OR APPLICATIONS

| | | | |
|---|---|---|---|
| 320,390 | 5/1957 | Switzerland | 219/438 |
| 425,023 | 5/1967 | Switzerland | 219/433 |
| 562,097 | 8/1958 | Canada | 219/535 |
| 75,858 | 10/1917 | Switzerland | 219/438 |
| 95,210 | 6/1922 | Switzerland | 219/433 |

*Primary Examiner*—A. Bartis
*Attorney, Agent, or Firm*—Brisebois & Kruger

[57] ABSTRACT

An electric heating mantle for flasks, retorts or other vessels, of the form having a heating cavity heated by electrical resistance heating means positioned close to a layer of metal gauze constituting the cavity defining surface of said mantle has its safety and operational capacity increased by the interposition, between the heating means and said metal gauze, of a moisture-proof membrane, preferably in the form of a rigid metallic cup having a bottom drain outlet for leading any spillage fluid safely away from the cavity and from contact with the heating means.

5 Claims, 1 Drawing Figure

PATENTED MAR 19 1974 3,798,418
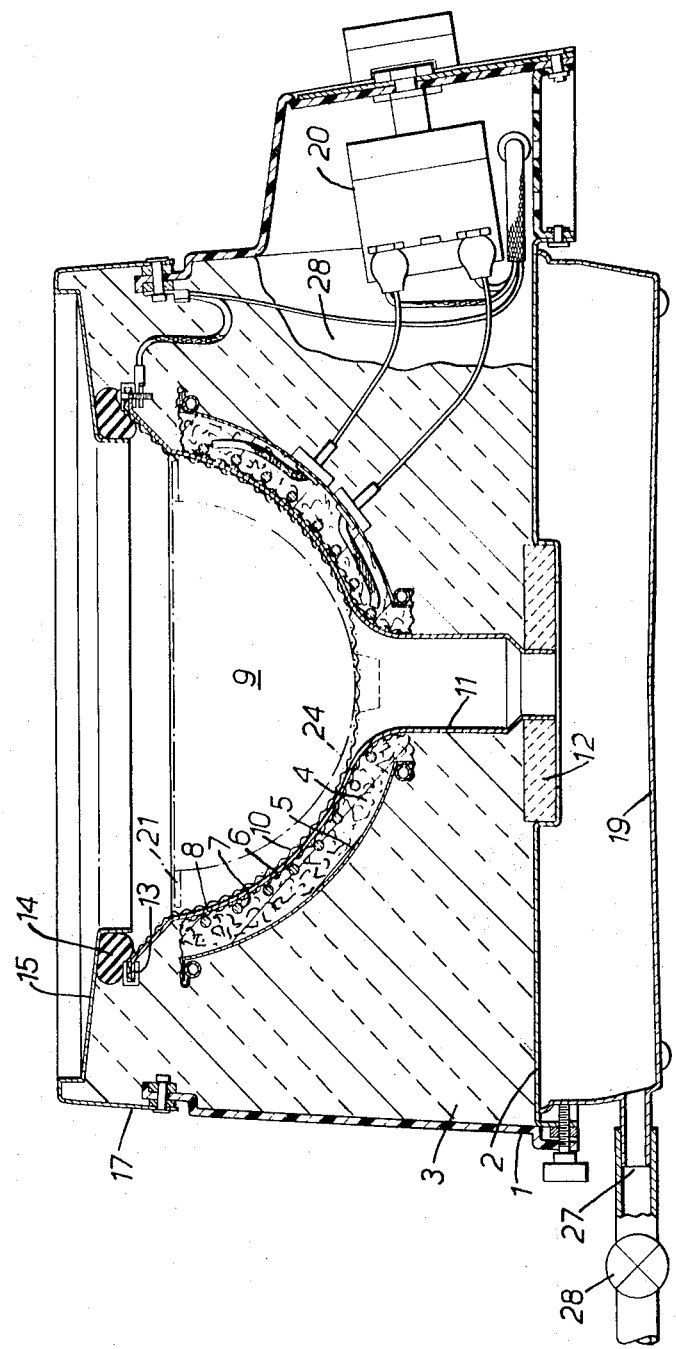

ELECTRIC HEATING MANTLES

This invention relates to electric heating mantles of the type having a generally cup-shaped cavity, open from above, to receive a flask, retort or other vessel to be heated by an electric heating element incorporated in or close to the surface of the cavity.

Typically, the surface of the cavity is formed by a glass fibre fabric, behind which is located an insulated heating element wound spirally around the cavity, the fabric and element being embedded in a heat insulation material, say of glass wool contained in an outer box-like outer casing, usually of sheet metal.

Such mantles have some capacity to absorb spillage, but an accumulation of moisture close to the heating element can cause a breakdown in the insulation with the consequent risk of short-circuiting through the outer casing.

In accordance with a feature of the present invention this risk is obviated or substantially reduced by the provision of a moisture proof, cup-shaped membrane between the heating element and the cavity of the mantle. The membrane may itself define the cavity or be lined, for example with a flexible metal gauze or mesh, which assists in ensuring substantially uniform heating of the surface of a vessel received in the cavity. The membrane is preferably constituted by a rigid metallic cup, which has the advantage of being cheaply and easily produced by deep drawing or spinning, and is preferably provided with a bottom outlet for draining off any liquid accumulating in the cup. However, even without the outlet, the cup can be designed to hold a substantial amount of liquid, with complete electrical safety, even in the extreme event, for example, of a flask or other vessel breaking, in operation of the mantle.

Since, by virtue of the membrane, the heating element is protected from contact with liquid, the choice of a suitable insulated heating element is less restricted, and high temperature elements may be employed. Indeed, it may be necessary in many cases to provide a high temperature element to compensate for the additional heat dissipation and/or thermal insulation introduced by the presence of the membrane.

In accordance with a further preferred feature of the invention, the electric heating element is externally lagged with a layer of high temperature thermal insulation, preferably having an outer coating or layer of heat-reflective foil. The bulk of the space inside the outer casing is preferably filled with standard thermal insulating material, and the interior of the casing is optionally lined with a heat reflective foil.

These heat insulation measures make it possible to construct the outer casing of plastics materials, instead of the relatively expensive sheet metals normally employed, as well as reducing to a minimum the risk of injury, especially by burning, of users of the mantle.

One form of heating mantle in accordance with the invention will now be described, by way of example, with reference to the accompanying drawing, which is an axial section of the mantle.

The mantle shown in the drawing comprises a tubular, generally cylindrical outer casing 1 having a detachable base or bottom wall 2, and containing a mass 3 of standard thermal insulation, for example in the form of glass wool or a rigid, foamed polymeric material. Embedded in this mass is a cup-shaped layer 4 of high temperature, low-conductivity thermal insulation, having an outer covering 5 of heat reflective foil or cup, for example, of aluminium. The layer 4 supports a glass cloth carrier 6 having secured to it a spirally wound electric heating element 7.

A rigid, spun metal cup 8, say of aluminium, forms a moisture-proof membrane between the element 7 and the heating cavity 9 of the mantle. A lining to the cavity is formed by a flexible metal gauze or mesh 10 which, in operation, acts to ensure substantially uniform surface heating of a flask or other vessel placed in the mantle.

The cup is provided at its lowest point with an integral bottom outlet 11, open at the underside of the casing and supported and heat insulated from the base 2 by a heat-break bush 12.

The upper end of the cup is formed with an outwardly directed peripheral flange 13 which forms a seating for a heat-break gasket 14, for example of asbestos rope. An annular cover plate 15 dished towards its centre, has its inner periphery engaged with the gasket 14. The cover has an external skirt 17 engaging over the upper end of the casing 1, and thus forms an additional trap for liquids, which can flow down towards the centre of the ring and into the cup 8.

The casing part is preferably of plastics material such as polypropylene, and the base 2 and cover plate 15 may be metal spinnings. The cup 8, and cover 15, are preferably earthed so as to give the user maximum protection from electric shorting. The casing may be lined with a heat reflective metallic foil to further its thermal insulation.

Preferably, and as shown, the outlet 11 discharges into a collecting tray 19 having a drain outlet 27 provided with a valve 28 for emptying the tray. Alternatively, the tray may simply be detached and removed for emptying. A control block 20, comprising an on/off switch and energy regulator is mounted on one side of the body 1, the insulation 3 being interrupted in this region to form an air pocket 28 around the control block.

It will be appreciated by those skilled in the art that the parts 10, 8, 7, 6, 4 and 5 form a distinct sub-assembly which may be used as a complete heating mantle in itself.

In order to enable the mantle to be used for heating vessels of different sizes or shapes, one or more separate adaptors may be provided, each comprising a part spherical or other cup-shaped metal mesh 24 to form a support for a vessel, having a rigid peripheral flange 21 dimensioned to fit in the cup 8 in the manner indicated in broken lines in FIG. 1. A vessel supported thereby is simply heated by conduction and radiation from the heater element 7.

We claim:

1. An electric heating mantle comprising insulating means defining a cup-shaped cavity open from above to receive a vessel to be heated, a layer of metal gauze forming a lining for said cavity, electric heating element means situated close to said cavity lining, and a moisture-proof rigid metallic cup between said cavity and said element means, said cup being formed with a drain outlet extending downwardly from the lowest part of said cup in the operative attitude of said mantle.

2. A mantle according to claim 1, comprising a layer of high temperature insulation having an outer covering of heat reflective material, said layer and said covering surrounding said heating element means.

3. A mantle as claimed in claim 1, further comprising a spillage collection tray disposed beneath said drain outlet of said cup.

4. A mantle as claimed in claim 1, further comprising at least one loose adaptor having a heat conductive cup-shaped wall and an outwardly projecting peripheral flange to said wall, said wall being shaped and dimensioned to receive a vessel of smaller size than that for which said cavity is dimensioned and said flange dimensioned to locate said adaptor in said cavity.

5. An electric heating mantle for heating a vessel, comprising:

a rigid metallic cup having a bottom drainage outlet;

a conductive metallic lining to the interior of said cup and constituting a cavity surface for heating a vessel positioned in said cup;

an electrical resistance heating element coiled in a plurality of turns around the exterior surface of said cup;

a cup-shaped body of high temperature insulation disposed about said heating element and having an outer covering of heat reflective foil;

a mass of heat insulating material embedding said cup, element, body and covering, and a casing containing said mass, said casing having a continuous side wall and an annular cover, said cover being dished downwardly towards its centre, whereby any liquid spilled onto said cover in use is constrained to run into said cup and then to said drainage outlet.

* * * * *

UNITED STATES PATENT OFFICE
CERTIFICATE OF CORRECTION

Patent No. 3,798,418   Dated 19 March 1974

Inventor(s) MICHAEL KURT REIK and PAUL LEONARD JOHNSON

It is certified that error appears in the above-identified patent and that said Letters Patent are hereby corrected as shown below:

[73] Assignee: Isopad Limited, Barnet Bypass, Borehamwood, England

Signed and sealed this 3rd day of September 1974.

(SEAL)
Attest:

McCOY M. GIBSON, JR.
Attesting Officer

C. MARSHALL DANN
Commissioner of Patents